United States Patent Office 3,732,172
Patented May 8, 1973

3,732,172
PROCESS FOR MAKING MINUTE CAPSULES AND PREFABRICATED SYSTEM USEFUL THEREIN
James A. Herbig and John F. Hanny, Dayton, Ohio, assignors to The National Cash Register Company, Dayton, Ohio
No Drawing. Filed Feb. 28, 1968, Ser. No. 708,792
Int. Cl. B01j 13/02; B44d 1/02
U.S. Cl. 252—316                                10 Claims

ABSTRACT OF THE DISCLOSURE

A process is provided for producing minute capsules, en masse, wherein volatile solvent is evaporated from droplets of dissolved polymeric material dispersed in a liquid manufacturing vehicle immiscible with the volatile solvent which droplets have enwrapped dispersed capsule core entities. The process includes only evaporation of the solvent from the solution of polymeric material and requires no liquid-liquid phase separation. Practice of the novel process requires that important system components, namely, (a) manufacturing vehicle, (b) solution of polymeric capsule-wall forming material, and (c) intended capsule core entities be mutually immiscible, inert, and mobile. For example, the core material may be $NH_4NO_3$, the wall material may be nitrocellulose, the solvent may be methyl ethyl ketone, and the vehicle may be heptacosafluorotributylamine.

BACKGROUND OF THE INVENTION

Field of the invention

This invention relates to a process for producing capsules, en masse, in a liquid manufacturing vehicle, and to its capsule product. It more specifically pertains to such a process wherein capsule walls of polymeric material are produced by evaporation of solvent from droplets of a solution of the polymeric material dispersed in the manufacturing vehicle. The polymeric material solution, according to practice of this invention, is dispersed, as before stated, in a manufacturing vehicle and the dispersed droplets wet and enwrap particles to be encapsulated which are also dispersed in the manufacturing vehicle. Evaporation of the solvent leaves each dispersed particle encapsulated by a dry, rigid film of the polymeric material.

Description of the prior art

Somewhat related to the present invention is the process taught in U.S. Pat. No. 3,161,602 issued Dec. 15, 1964 on the application of James A. Herbig and John F. Hanny, the inventors herein, and assigned to the assignee herein. In that patent, as in the subject invention, an encapsulating system of three mutually immiscible, mobile and inert components were agitated together to produce capsules. In the patent, however, the capsule wall material was a meltable wax material and not a liquid solution of polymeric material as is the case in the present invention. The encapsulating process was conducted at a temperature above the melting point of capsule-wall-forming wax material and the system was then cooled to solidify the capsule walls. No evaporating step was conducted in the process.

Also somewhat related to the present invention is the process taught in U.S. Pat. No. 2,183,053 issued Dec. 12, 1939 on the application of Harden F. Taylor. In that patent, a process was taught for producing beadlets of a vitamin-containing liquid in a matrix of gelatin wherein an emulsion of the vitamin-containing liquid in hot gelatin solution was disposed in a mutually immiscible liquid vehicle to form a poly-phase dispersion. The system was then cooled and the gelatin solution "set" to form beadlets of gelled emulsion. In a final step, the chilled system was agitated to allow evaporation of water from the gelled gelatin beadlet matrix. In the above-mentioned U.S. Pat. No. 2,183,053, material is contained as a multitude of tiny particles in a matrix phase of gellable material and, before the drying step, the matrix must be gelled by cooling; while, in contrast, the subject invention teaches a method for containing, in individual capsule walls, single particles of an intended capsule core material without the necessity for producing an emulsion of the capsule core material and the capsule wall material. Moreover, the subject invention does not require gellable polymeric material for capsule walls and does not, therefore, require a cooling step in the process prior to drying the capsule walls.

SUMMARY OF THE INVENTION

The present process includes the establishment of an agitated, three-phase, liquid system of substantially mutually immiscible components, namely, (a) A major portion of a liquid manufacturing vehicle having a low viscosity relative to the other components;

(b) A minor portion of a normally solid film-forming polymeric material in liquid solution in a volatile solvent, said solution having a viscosity of between 100 and 10,000 centipoises, the aforementioned agitation being sufficient to disperse it as minute entities in (a); and (c) A minor portion of intended capsule core material dispersed as particles, by the agitation, amongst the entities of (b);

wherein the dispersed core material particles are coated with liquid walls of the polymeric material solution, and wherein continued agitation offers means for the volatile solvent of component (b), above, to evaporate, leaving a seamless self-sustaining wall of material shrunken around each core material particle. Components (b) and (c) constitute a minor portion of the system so that moderate agitation is sufficient to disperse them, as particles, in component (a)—the manufacturing vehicle. Obviously, the vehicle, (a), and minor-volume components, (b) and (c), should be mutually immiscible and mutually unreactive.

Although it has been stated that the viscosity of solution (b) can, initially, be in the range of 100 to 10,000 centipoises, the preferred range for easy dispersion of it in the system and for efficient wrapping of the core particles, is about 1,000 to 4,000 centipoises.

The process of the present invention can be carried out with hydrophilic or hydrophobic intended capsule core material. The film-forming polymeric, capsule wall material is selected accordingly for immiscibility and non-reactivity in the system and can be either synthetic or naturally-occurring.

Solvents selected for use in the present encapsulating process must be chosen: (a) to dissolve the polymeric capsule wall material; (b) to be substantially immiscible with the manufacturing vehicle and the intended capsule core material and, also (c) to be more volatile, that is, have a higher vapor pressure, than the manufacturing vehicle and the intended capsule core material.

Some solvents for the polymeric capsule wall material, due to their vapor pressure characteristics may admit of the encapsulating to be carried on at accordingly higher or lower temperatures, and such characteristics may be utilized to advantage in connection with some capsule core materials. For instance, if the capsule core material is sensitive to high temperature, a system permitting low operating temperature can be used, that is—one in which the manufacturing vehicle and polymeric material-solution are mobile liquids at the low temperature and in which the polymeric material solvent is adequately volatile at the desired low temperature. On the other hand, if the core material is sensitive to low temperature, for example, by reason of its being solidified, a system permitting high operating temperature can be used, that— one in which the vehicle and polymeric material-solution are mobile liquids at high temperature and in which the polymeric material solvent exhibits low enough vapor pressure at the desired high temperature.

After the deposit of the film-forming material solution has been made onto the core material particles to provide liquid-walled embryonic capsules, the polymeric material solvent is evaporated by continuing agitation of the system for a time to permit repeated surfacing of the capsules to the atmosphere. The time period necessary to evaporate the solvent from the liquid capsule walls may be reduced by:

(a) heating the agitated system;
(b) heating the atmosphere coming in contact with the surface of the agitated system;
(c) reducing the environmental pressure of the system;
(d) circulating the environmental atmosphere; or
(e) combining steps (a), (b), (c), and (d) in any manner.

It will be apparent that a solvent for the capsule wall material which is highly volatile at room temperature may be used if the system is under pressure or below room temperature while the liquid walls are being formed on the intended capsule core particles. The step of bringing the system to atmospheric pressure and/or to room temperature can be utilized to expedite, in terms of time, the removal of solvent from the capsule walls. Such low temperature operation permits encapsulation of core materials which are sensitive to a room temperature environment and which would be adversely effected by being coated with the polymeric material solution at about room temperature or above, or which would be difficult to coat due to volatility or decomposition at room temperature.

It is to be understood that hardening of the deposited capsule wall material solution is a process of solvent loss by evaporation, and does not depend on any condition or change of condition which renders the polymeric capsule wall material less soluble in the solvent liquid. There is no liquid-liquid phase separation in the process—only evaporation of solvent from the wall-forming-material solution. No cooling or washing operations, hardening agents, changes in pH, or other devices or techniques heretofore used in the formation of minute capsules in liquid manufacturing media are involved. The non-volatile liquid manufactuirng vehicle may be used over again in repeated cycles—additions of polymeric material solution and core material serving to reconstitute capsule-producing materials between cycles.

The novel process can be adapted to producing capsules regardless of the hydrophilic or hydrophobic characteristics of the capsule core materials, because the manufacturing vehicle and the capsule wall material solvent are selected to be inert in this respect and serve only as a dispersion support and a capsule wall material solvent, respectively. As explained previously, the manufacturing vehicle and the capsule-wall-material-solvent must, of course, be mutually immiscible as well as immiscible with the capsule core material. Provided that there is no incompatibility with the solution of capsule wall-forming material, the entities of capsule core material may be heterogeneous as to physical state or chemical composition, if said capsule core entities do not react with one another.

For the purpose of disclosing the invention in its preferred form, a fluorinated hydrocarbon liquid is selected from the following group, which is not to be deemed exhaustive in any sense, and will be referred to in the various examples as the "vehicle":

(A) Heptacosafluorotributylamine, which is tributylamine, $(C_4H_9)_3N$, in which the hydrogen has been replaced with fluorine (boiling point 170 degrees centigrade); and (B) A mixture of perfluoro cyclic ether isomers $C_8F_{16}O$ with a boiling point range of 97–107 degrees centigrade (Sold by Minnesota Mining & Manufacturing Co., St. Paul, Minnesota, United States of America, Under the designation, "FC–75").

Compound (A) is more inert and immiscible with respect to common volatile, solvents than is compound (B), —compound (B) being less useful in that respect but, on the other hand, compound (B) is less expensive than compound (A) at the present time, and can be used satisfactorily with certain capsule wall-materials and solvents.

Inasmuch as the heat energy necessary to evaporate the capsule wall-material-solvent depends on the type of solvent which is used and on the time allowed for operations of the process as a whole, the process, in essence, does not necessarily depend on a special heating step. Room temperature or below may be used in some instances, for the complete encapsulating process. Heating-time and cooling-time and cost in a recycling aspect of the process are a few of the economic factors to be considered in the selection of solvents for the capsule wall material.

Representative, synthetic, hydrophobic wall materials eligible for use in liquid vehicles (A) or (B), above, are film-forming polymeric materials including:

(I) vinyl acetate
(II) methyl methacrylate
(III) vinyl chloride
(IV) vinyl carbonate
(V) ethylcellulose
(VI) nitrocellulose
(VII) styrene
(VIII) vinylidene chloride/acrylonitrile
(IX) vinylfluoride/chlorotrifluoroethylene
(X) vinylchloride/vinyl acetate
(XI) vinyl butyral
(XII) vinyl formal Representative solvents eligible for use with one or more of polymeric materials I to XII, above, include:

(1) ethylmethylketone
(2) isobutylmethylketone
(3) acetone
(4) tetrahydrofuran
(5) 1,4-dioxane
(6) ethyl acetate
(7) butyl acetate
(8) cyclohexanone
(9) cyclohexane
(10) ethylene dichloride
(11) toluene
(12) chloroform
(13) carbon tetrachloride Representative eligible solvent systems for use with particular polymeric materials in this process include:

| Polymeric material: | Solvent |
| --- | --- |
| (I) | 1,2,3,6,7 |
| (II) | 1,3,5,10,12 |
| (III) | 1,4,6,8 |
| (IV) | 9,12 |
| (V) | 1,2,3,7,10 |
| (VI) | 1,2,4,6,8 |
| (VII) | 6,7,10,11,13 |
| (VIII) | 1,4,8 |
| (IX) | 1,2,4,8 |
| (X) | 1,2,6,7,9 |
| (XI) | 1,2,6,8,9 |
| (XII) | 1,5,6,8,9 |

The solvent action of the various solvents named and others not named, singly or in combination, on the named polymeric materials, and others, either is known in the literature or may be empirically ascertained, and the number of combinations available for use in this process is so vast that only guides can be given in the way of preferred and other examples.

It should be noted, that in practicing the process of the present invention, several conditions and qualifications with regard to the encapsulating system should preferably be maintained. The three phases (manufacturing vehicle, polymeric material solution, and dispersed capsule core material) must be substantially mutually immiscible and chemically inert. The polymeric material solution should have a viscosity such that it will deposit on and enwrap entities of capsule core material—about 100 to 10,000 centipoises having been previously indicated as an operable viscosity range with a range of 1,000 to 4,000 centipoises having been indicated as preferred.

A capsule-manufacturing environment, with regard to pressure and temperature, should be provided which permits the solvent to evaporate from the liquid capsule walls within a reasonable time, such time being a limiting factor only as regards the commercial efficiency of the operation, Sufficient mobility for the dispersed entities of capsule wall material and capsule core material in the liquid manufacturing vehicle is easily provided and the materials which constitute capsule walls and capsule cores, therefore, are not critical as to composition—there being a large choice among those named above, and, moreover, those named above are not named to restrict the invention but to indicate its fundamental breadth.

DESCRIPTION OF PREFERRED EMBODIMENTS

With the above considerations in mind, preferred embodiments of the novel process will now be described. The ratios of materials in the following examples are important only in a general way because the factors which affect desired or required ratios of materials to be used, such as the particle size of the core entities used, the desired capsule wall thickness, the degree of agitation to be provided, and other factors, may be varied within wide limits. The amounts of materials used may be varied within the proportions found most suitable, if larger or smaller batches of capsules are to be made.

EXAMPLE 1

In this example ammonium nitrate was encapsulated in nitrocellulose capsule walls—the nitrocellulose having 11.8 percent to 12.2 percent by weight, nitrogen and viscosity of 600 to 1000 seconds when tested using the falling ball method wherein a steel ball $\frac{3}{32}$-inch in diameter requires 600–1000 seconds to fall two inches through a 12.2 percent, by weight, solution of the nitrocellulose in acetone at a solution temperature of 25 degrees centigrade.

The following agitated system was established in a 4-liter beaker:

Ammonium nitrate, fifty to several hundred microns, powder size _____ grams__ 80
4 percent, by weight, of the specified nitrocellulose in ethylmethylketone _____ grams__ 200
Heptacosafluorotributylamine ("FC-43" as sold by Minnesota Mining & Manufacturing Company, St. Paul, Minnesota) _____ liters__ 2 which, after a dispersion had been established, resulted in each ammonium nitrate particle being coated with a liquid, seamless, capsule wall of nitrocellulose-ethylmethylketone solution.

To make the liquid capsule walls solid and self-sustaining, the solvent therein was evaporated into the atmosphere at the surface of the system by continuing the agitation of the system at a speed just under that at which the agitation shearing forces had a tendency to whip off the capsule walls—the type of agitation provided being such as to bring the capsules repeatedly to the surface of the manufacturing vehicle to expose them to the atmosphere. The atmosphere may be air provided at normal atmospheric pressure or at reduced pressure, either dehumidified or heated or both dehumidified and heated, or it may comprise drying gases substituted for air.

EXAMPLE 2

The following agitated system was established in a 4-liter vessel:

Ammonium nitrate, fifty to several hundred microns, powder size _____ grams__ 80
15 percent, by weight, of a chlorotrifluoro-ethylene polymer ("Kel-F 820" as sold by Minnesota Mining & Manufacturing Company, St. Paul, Minnesota) dissolved in tetrahydrofuran ___grams__ 133
Heptacosafluorotributylamine _____ liters__ 2 which was processed in the same manner as the styrene described in Example 1.

In the operation of evaporating the solvent, the liquid coating took the form of a dense film of polymeric material that was shrunk onto the contours of the solid capsule core particles, whatever their shape. The ratio of the amount of polymeric material to the area of the surface of the core particles to be coated was small and the final thickness of solid material around each particle was measured in fractions or units of microns.

What is claimed is:

1. A process for manufacturing minute capsules en masse in a liquid manufacturing vehicle, including the steps of:
   (a) providing an agitated system of
      (1) a major amount of a non-volatile substantially inert, liquid manufacturing vehicle,
      (2) a minor amount of a solution of a polymeric film-forming, normally solid, capsule wall material dissolved in a volatile solvent immiscible with (1) such that (2) is substantially free of the manufacturing vehicle and (1) is substantially free of the volatile solvent and (2) is of such concentration as to have a viscosity of between 100 and 10,000 centipoises, the agitation dispersing the solution as minute liquid droplets in the vehicle, and
      (3) entities of capsule core material insoluble in (1) and (2) said agitation dispersing capsule material entities amongst the droplets of (2) and causing deposition of droplets of (2) onto entities of (3) to form a liquid capsule wall about each entity; and
   (b) continuing agitation of the system, to cause the solvent of deposited solution (2) to evaporate therefrom to leave capsule material entities encapsulated by a dry, rigid, film of the capsule wall material and dispersed in the manufacturing vehicle.

2. The process of claim 1 wherein the evaporation of solvent is accomplished by prolonged agitation of the system after the deposition of the liquid capsule walls, which agitation brings the liquid-walled entities to the surface of the system repeatedly where exposure to the atmosphere aids in evaporation of the solvent and in formation of rigid-walled capsules.

3. The process of claim 2 wherein the system is heated, after the deposit of capsule wall material solution has been made, to aid in the evaporation of the solvent.

4. The process of claim 2 wherein the atmosphere in contact with the surface of the system is heated to aid in the evaporation of the solvent.

5. The process of claim 2 including additional steps wherein the capsules are recovered from the system and the system is reconstituted with capsule-producing materials to bring the system to its original capsule-forming capability.

6. The process of claim 1 in which the pressure of the atmosphere in contact with the surface of the system is reduced to aid in the evaporation of solvent.

7. A pre-fabricated system from which minute capsules may be made, en masse, consisting essentially of, in a container sealed against evaporation of a solvent therefrom by exposure to the atmosphere:
  (a) a major amount of a non-volatile substantially inert organic liquid manufacturing vehicle, and
  (b) a minor amount of a solution of a polymeric, film-forming, capsule wall material dissolved in a volatile solvent immiscible with (a) such that (b) is substantially free of the manufacturing vehicle and (a) is substantially free of the volatile solvent and (b) is of such concentration as to have a viscosity of between 100 and 10,000 centipoises.

8. A pre-fabricated system from which capsules may be made, en masse, consisting essentially of, in a container sealed against evaporation of a contained solvent by exposure to a gaseous environment:
  (a) a major amount of a liquid manufacturing vehicle taken from the class consisting of a mixture of perfluoro-cyclic ether isomers having a boiling point range of 97–107 degrees centigrade and heptacosafluorotributylamine, and
  (b) a minor amount of a liquid solution of a normally solid polymeric film-forming capsule wall material dissolved in volatile solvent immiscible with (a) such that (b) is substantially free of the manufacturing vehicle and (a) is substantially free of the volatile solvent and (b) is of such a concentration as to have a viscosity of 100 to 10,000 centipoises.

9. A pre-fabricated system consisting of a major portion of an inert liquid manufacturing vehicle which is a dispersal medium for the remainder of the system which consists essentially of:
  (a) a minor amount of liquid consisting of a normally solid polymeric film-forming material dissolved in volatile liquid solvent material to form a liquid solution with a viscosity of from 100 to 10,000 centipoises, and
  (b) a minor amount of minute particles of capsule core material insoluble in the vehicle said (a) and (b) being mutually immiscible and each being immiscible with the inert liquid vehicle such that (a) and (b) are substantially free of the inert liquid vehicle and the inert liquid vehicle is substantially free of (a) and (b), and said system being storable under conditions preventing evaporation of the solvent.

10. A process for making minute capsules en masse, including the steps of agitating in a vessel provided with an inert liquid manufacturing vehicle:
  (a) intended capsule core particles, and
  (b) a liquid solution of film-forming wall material capable of being made rigid by evaporation of substantially all of the solvent therefrom,
wherein (b) is of such a concentration as to have a viscosity of 100 to 10,000 centipoises and wherein said (a) and (b) are mutually immiscible and each is immiscible with the liquid manufacturing vehicle such that (a) and (b) are substantially free of the liquid manufacturing vehicle and the liquid manufacturing vehicle is substantially free of (a) and (b); the agitation being continued until the solution coats the particles each with a liquid wall that becomes eventually rigid by reason of the evaporation of the solvent therefrom, (b) being present in minor volume dispersed in the vehicle and of a viscosity enabling it to be interspersed in the vehicle amongst the capsule core particles as liquid droplets to contact and coat the particles, and the agitation being sufficient to repeatedly bring all of the liquid-walled capsules to the vehicle surface successively to afford opportunity for the solvent to evaporate and the walls to become rigid.

References Cited
UNITED STATES PATENTS

| | | | |
|---|---|---|---|
| 3,155,590 | 11/1964 | Miller et al. | 252—316 X |
| 3,161,602 | 12/1964 | Herbig et al. | 252—316 |
| 3,173,878 | 3/1965 | Reyes | 252—316 |

FOREIGN PATENTS

| | | | |
|---|---|---|---|
| 1,048,696 | 11/1966 | Great Britain | 252—316 |

RICHARD D. LOVERING, Primary Examiner

U.S. Cl. X.R.
117—100 A, 100 B